United States Patent
Paganessi et al.

(12)

(10) Patent No.: US 6,272,790 B1
(45) Date of Patent: *Aug. 14, 2001

(54) METHOD AND DELIVERY SYSTEM FOR THE CARBON DIOXIDE-BASED, AREA SPECIFIC ATTRACTION OF INSECTS

(75) Inventors: Joseph Paganessi, Burr Ridge, IL (US); Robert Lee, Calgary (CA); Jonathan F. Day, Vero Beach, FL (US)

(73) Assignees: University of Florida, Gainesville, FL (US); Air Liquide Canada, Montreal (CA); TMJ Enterprises, Inc., Burr Ridge, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,993

(22) Filed: May 21, 1999

Related U.S. Application Data

(63) Continuation of application No. 08/816,437, filed on Mar. 14, 1997, now Pat. No. 5,943,815.

(51) Int. Cl.[7] .................................................. A01M 1/02
(52) U.S. Cl. ............................................. 43/107; 43/132.1
(58) Field of Search ............................. 43/107, 114, 124, 43/131, 132.1

(56) References Cited

U.S. PATENT DOCUMENTS

| 197,363 | 11/1877 | Headington | 43/107 |
|---|---|---|---|
| 718,834 | 1/1903 | Godfrey | 43/107 |
| 2,921,595 | 1/1960 | Erbguth | 239/596 |
| 3,150,832 | 9/1964 | Soth | 239/596 |

(List continued on next page.)

FOREIGN PATENT DOCUMENTS

| 9220 441 | * | 1/1993 | (AU) . |
|---|---|---|---|
| 9511 632 | * | 8/1995 | (AU) . |
| 1012627 | * | 1/1965 | (GB) . |
| 1561088 | * | 2/1980 | (GB) . |

(List continued on next page.)

OTHER PUBLICATIONS

Day, J.F. and R. D. Sjogren. 1994. Vector control by removal trapping. Am. J. Trop. Med. Hyg. 50 Suppl.: 126–133.*

Bogner, F. 1992. Response properties of CO2–sensitive recepters in tsetse flies (Diptera: Glossina palpalis). Physiological Entomology 17:19–24.*

Gillies, M.T. 1980. The role of carbon dioxide in host–finding by mosquitoes (Diptera: Culicidae): a review. Bulletin Entomological Res. 70:S25–532.*

Kline, D.L., J.R. Wood and J.A. Cornell, 1991. Interactive effects of 1–octen–3–ol and carbon dioxide on mosquito (Diptera: Culicidae) surveillance and control. J. Medical Entomol. 28:254–258.*

(List continued on next page.)

Primary Examiner—Darren W. Ark
(74) Attorney, Agent, or Firm—Burns, Doane, Swecker & Mathis, L.L.P.

(57) ABSTRACT

A method and delivery system for an area-specific precision control of biting insects, including flying and non-flying, biting arthropods, is described. $CO_2$ is metered through a tubing fence and dispensed into the center of traps that serve as visual targets for flying or walking biting arthropods. The outside membrane of a trap can be treated with mineral oil to capture and kill small arthropods such as sand flies of the genus Culicoides, or black flies of the genus Simulium. In addition, the membrane can be treated with insecticide formulations of Permethrin, Resmethrin, or Deltamethrin, to kill larger biting arthropods, such as ticks, mosquitoes, deer flies, horse flies, or stable flies. This method for biting arthropod control is an ecological-friendly alternative to the widespread broadcast application of organophosphate insecticides such as Derspan, Diprom, and Malthion.

20 Claims, 4 Drawing Sheets

U.S. PATENT DOCUMENTS

| | | | |
|---|---|---|---|
| 3,889,881 | | 6/1975 | Cunningham et al. ................ 239/70 |
| 4,168,591 | | 9/1979 | Shaw ...................................... 43/124 |
| 4,244,521 | | 1/1981 | Guse ..................................... 239/596 |
| 4,346,848 | | 8/1982 | Malcolm .............................. 239/596 |
| 4,402,972 | | 9/1983 | Martel et al. ........................ 514/521 |
| 4,506,473 | | 3/1985 | Waters, Jr. ............................. 43/107 |
| 4,714,712 | | 12/1987 | Matsuo et al. ....................... 514/531 |
| 4,768,712 | | 9/1988 | Terrell ................................... 239/68 |
| 4,774,369 | | 9/1988 | Matsuo et al. ........................ 568/843 |
| 4,895,303 | | 1/1990 | Freyvogel .............................. 239/68 |
| 4,907,366 | | 3/1990 | Belfour ................................ 43/132.1 |
| 4,917,304 | | 4/1990 | Mazzei et al. ......................... 239/69 |
| 5,021,939 | | 6/1991 | Pulgiese ................................ 239/69 |
| 5,193,744 | | 3/1993 | Goldstein .............................. 239/69 |
| 5,205,064 | | 4/1993 | Nolen .................................... 43/112 |
| 5,205,065 | | 4/1993 | Wilson et al. ......................... 43/113 |
| 5,228,233 | * | 7/1993 | Butler et al. ........................... 43/113 |
| 5,229,937 | | 7/1993 | Evelyn-Veera ........................ 239/69 |
| 5,241,778 | | 9/1993 | Price ................................... 43/132.1 |
| 5,327,675 | | 7/1994 | Butler et al. ........................... 43/113 |
| 5,382,422 | | 1/1995 | Dieguez et al. ....................... 43/111 |
| 5,409,958 | | 4/1995 | Butler et al. ......................... 514/690 |
| 5,417,009 | * | 5/1995 | Butler et al. ........................... 43/113 |
| 5,439,941 | | 8/1995 | Butler et al. ......................... 514/690 |
| 5,657,576 | | 8/1997 | Nicosia ............................... 43/132.1 |
| 5,669,176 | | 9/1997 | Miller .................................... 43/139 |
| 5,813,165 | * | 9/1998 | Wigton et al. ......................... 43/107 |
| 5,813,166 | | 9/1998 | Wigton et al. ......................... 43/107 |
| 5,943,815 | * | 8/1999 | Paganessi et al. ..................... 43/107 |

FOREIGN PATENT DOCUMENTS

| | | | |
|---|---|---|---|
| 51-112526 | * | 10/1976 | (JP) . |
| 52-99217 | * | 8/1977 | (JP) . |
| 54-95732 | * | 7/1979 | (JP) . |
| 59-98008 | * | 6/1984 | (JP) . |
| 60-42302 | * | 3/1985 | (JP) . |
| 62-77304 | * | 4/1987 | (JP) . |
| 2-69407 | * | 3/1990 | (JP) . |
| 0600 0046 | * | 1/1994 | (JP) . |
| 0720 3821 | * | 8/1995 | (JP) . |

OTHER PUBLICATIONS

Service, M. W. 1976. Sampling adults with carbon dioxide traps, light traps, attraction traps and sound traps. In Mosquito Field Sampling methods, Chapter 6, pp. 306–377.*

Takken, W. and D.L. Kline. 1989. Carbon dioxide and 1–octen–3–ol as mosquito attractants. J. Am. Mosq. Control Assoc. 5:311–316.*

Hearnden, Mark N. and Kay, Brian H. Changes in Mosquito Populations with Expansion of the Rose River Reservoir, Australia, From Stage 1 to Stage 2A, Journal of American Mosquito Control Association, 11(2):211–224, 1995.*

D. Petric, M. Zgomba, M. Ludwig and N. Becker. Dependence of CO2–Baited Suction Trap Captures on Temperature Variations, Journal of American Mosquito Control Association, 11(1):6–10, 1995.*

* cited by examiner

METHOD AND DELIVERY SYSTEM FOR THE CARBON DIOXIDE-BASED, AREA SPECIFIC ATTRACTION OF INSECTS

This application is a continuation, of application Ser. No. 08/816,437, filed Mar. 14, 1997, now U.S. Pat. No. 5,943,815.

FIELD OF THE INVENTION

The present invention relates to a method and apparatus for dispensing an insect attractant such as carbon dioxide along a pipeline. The invention further relates to a method and apparatus for releasing carbon dioxide gas into insect traps for purposes of capturing and/or exterminating insects.

BACKGROUND OF THE INVENTION

Flying and biting insects are presently controlled by the application of insecticides directed either at immature stages (larvicides) or adults (adulticides). These compounds are generally applied as a broadcast spray from either the air or the ground. This broadcast application generally results in two levels of failure. First, large areas of land and water are treated where there are no insects. Second, non-target, beneficial organisms are oftentimes affected and sometimes killed by the broadcast treatment.

Solid $CO_2$ (dry ice) has been used as an attractant for flying and biting insects insects to gather data about this insect population density. This data has been used to aid in determining when broadcast application of insecticides is needed, and in what amounts. While dry ice has been effective as bait for insects because it sublimates $CO_2$ gas into the atmosphere, there have been no effective methods of metering the amounts of $CO_2$ gas released from a source of $CO_2$ for attracting insects.

SUMMARY OF THE INVENTION

In light of the foregoing, a need exists for a way of more accurately targeting insects for extermination or capturing without adversely affecting the surrounding environment.

A need also exists for a way of more accurately targeting insects for capture extermination and/or capture without exterminating/capturing unintended organisms.

According to one aspect of the present invention, a system for attracting an insect population comprises a source of chemical attractant for insects, a distribution feed tube in fluid communication with the source, a controller for controlling the flow of attractant from the source through the distribution feed tube, and at least one target in fluid communication with the distribution feed tube, the target including means for effecting, when an insect comes into contact with the target, capture of the insect and extermination of the insect.

According to another aspect of the present invention, a target for trapping and/or exterminating insects comprises a support structure, a surrounding element mounted on the support structure for defining an interior space within the surrounding element, means provided on the surrounding element for effecting at least one of capture of an insect that comes into contact with the surrounding structure and extermination of an insect that comes into contact with the surrounding structure, and a tube extending into the interior space of the surrounding structure for introducing $CO_2$ containing gas into the interior space to attract insects into coming into contact with the surrounding structure.

According to yet another aspect of the present invention, a process for attracting an insect population to a target comprises the steps of providing a system for capturing or exterminating and/or capturing insects, flowing primary chemical insect attractant from said source through said distribution feed tube to said at least one target, controlling the flow of said primary chemical insect attractant with said controller, and contacting insects with said means for either capturing or exterminating.

According to yet another aspect of the present invention, a controller for controlling the mixture and distribution of a primary chemical insect attractant comprises means for conducting a flow of said primary chemical insect attractant, switch means for determining whether the flow rate of said primary chemical insect attractant through said conducting means has exceeded a predetermined limit value, said switch means comprising timer means for evaluating the time elapsed while there is flow in said conducting means, said switch means generating a limit control signal, valve means, in control signal communication with said switch means and responsive to said limit control signal, for allowing flow of said primary chemical insect attractant through said conducting means when open and substantially stopping flow of said primary chemical insect attractant through said conducting means when closed, said switch means controlling said valve means with said limit control signal to close when either said timer means indicates that a predetermined time has elapsed or flow in said conducting means exceeds a predetermined level.

Still other objects, features, and attendant advantages of the present invention will become apparent to those skilled in the art from a reading of the following detailed description considered with reference to the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
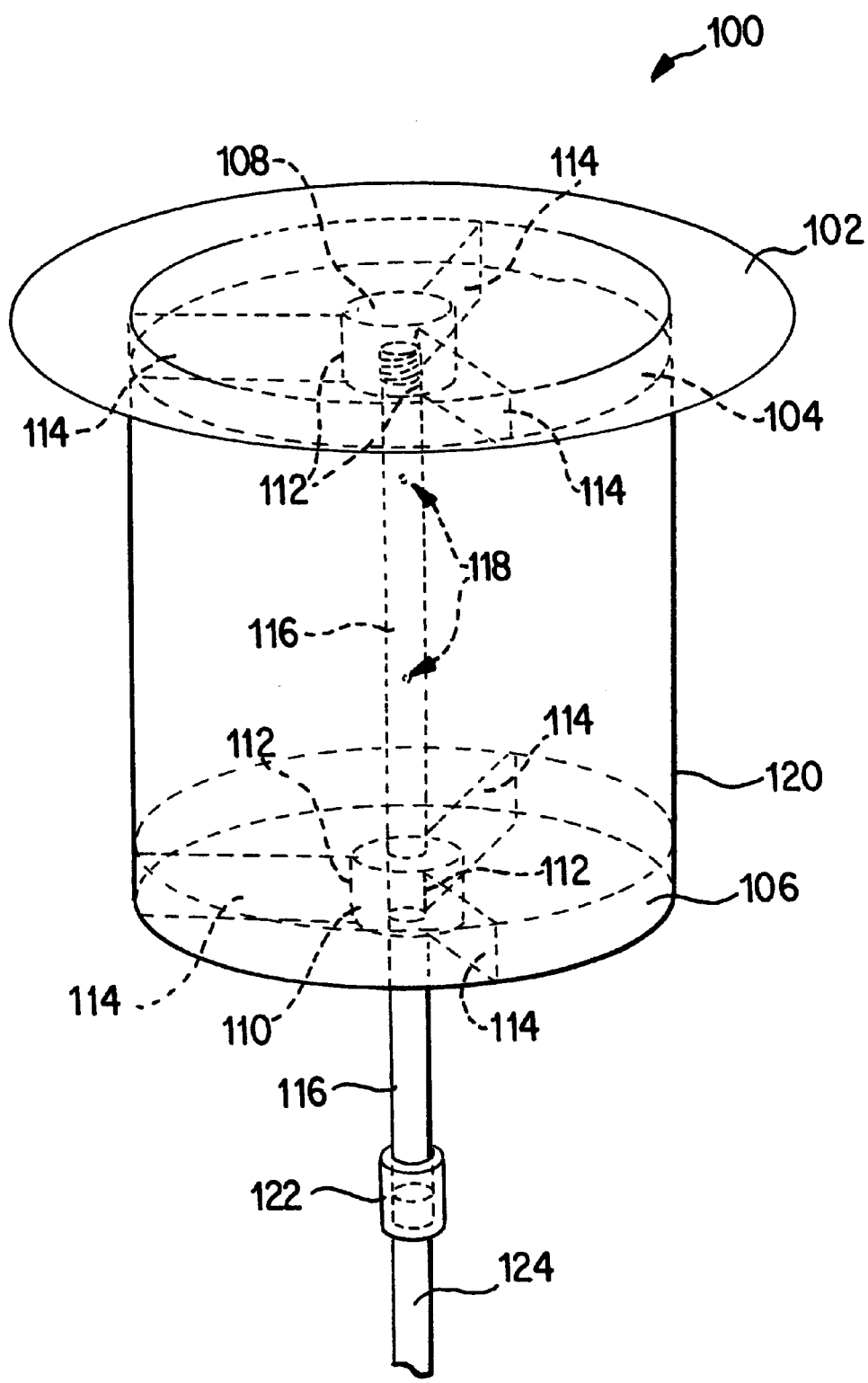
FIG. 1 is a perspective view, partially in phantom, of a target according to the present invention.

Ambient levels of $CO_2$ in the environment are typically on the order of 0.03% or less. Insects such as biting arthropods are attracted to $CO_2$ at concentrations greater than 0.03%. Increases in concentration of $CO_2$ as small as 0.1 ppm (parts per million) above the ambient level often indicate to the insect the presence of a vertebrate host (e.g., human) that can serve as a source of blood. Additionally, $CO_2$ released at rates of 200 to 1,000 millimeters per minute can be used to attract flying and biting insects to localized killing stations. The addition of other compounds, such as acetone or octenol, produces a synergistic affect, greatly increasing the number of individual arthropods attracted to killing stations.

Flying and biting insects are attracted to mammals based upon the mammal's output of $CO_2$ through, e.g., expiration.

For example, an average human releases approximately 750 millimeters per minute of $CO_2$, while an average horse releases approximately 2 liters per minute of $CO_2$.

$CO_2$ is available as a liquified gas under its own vapor pressure of 5.7 MPa at 20° C. in standard high-pressure vessels containing 9 to 23 kg of gas. Liquid $CO_2$ is also available from low-pressure, insulated bulk tanks where the pressure is kept low by maintaining the temperature of the tank at a suitable low level with a mechanical refrigeration unit. Low pressure vessels are available in capacities of 2,720 kilograms, 3,630 kilograms, 5,440 kilograms, 11,800 kilograms, 21,800 kilograms, and 28,100 kilograms.

According to the present invention, a chemical attractant for arthropods, e.g. carbon dioxide ($CO_2$) from bulk storage tanks, optionally $CO_2$ mixed with a secondary attractant such as octenol, can be metered into a PVC pipeline, hereinafter referred to as a $CO_2$ fence. The gas, or gas mixture, is then fed into insect or arthropod traps spaced at roughly equal intervals. Arthropods attracted to the traps are captured in thin mineral oil coatings, and possibly also poisoned, when they make contact with the treated outer membranes on the surface of the trap. Arthropods, the abatement of which is the subject of the present invention, include, but are not limited to, sand flies of the genus Culicoides, black flies of the genus Simulium, ticks, mosquitoes, deer flies, horse flies, and stable flies.

Systems and processes according to the present invention are environmentally friendly alternatives to broadcast applications of insecticides. The $CO_2$ fence can be used to control insects in any environment. The technique is quite desirable in that it is insect-specific and does not adversely affect non-target organisms. The system is further advantageous in that it can be adapted to control biting arthropods within clearly defined areas.

The release rate of $CO_2$ from a target according to the present invention can be predetermined by the type of mammal that it is desired that the target mimic. For example, if it is desired that the target mimic a human, the release rate of $CO_2$ into the atmosphere through the target may be controlled to be approximately that of an average human, i.e., 750 millimeters per minute.

FIG. 1 illustrates a target 100 according to the present invention. As illustrated in FIG. 1, target 100 includes a top plate 102 which may be made of PVC, nylon, ABS, or any other material which is preferably easy to handle, easy to manufacture and has a low cost, as would be readily apparent to one of ordinary skill in the art. Target 100 also includes a support structure including a top support ring 104 and a bottom support ring 106.

Both the top support ring 104 and the bottom support ring 106 are attached to generally cylindrical bodies 108, 110, respectively. Each cylindrical body 108, 110 includes a center bore (shown in phantom in FIG. 1). Top cylindrical body 108 and bottom cylindrical body 110 both further include slots 112 into which are inserted support legs 114. Support legs 114 are inserted into slots 112 and affixed in place. Any number of support legs 114 may be used; three support legs for each of the top support ring 104 and bottom support ring 106 are shown in the embodiment illustrated in FIG. 1. The bore in top cylindrical body 108 (shown in phantom) is drilled approximately half-way into the top cylindrical body 108. The bore (shown in phantom) in bottom cylinder body 110 is drilled through the entire length thereof.

A $CO_2$ feed tube 116 is inserted through bottom cylindrical body 110 and into top cylindrical body 112 through their respective bores. $CO_2$ feed tube 116 forms a loose seal with top cylindrical body 108. $CO_2$ feed tube 116 includes feed holes 118 along the length of $CO_2$ feed tube 116 between top support ring 104 and bottom support ring 106. Feed holes 118 fluidly communicate the outside of $CO_2$ feed tube 112 with an inside bore (not shown) thereof.

Top support ring 104 and bottom support ring 106 are wrapped in a surrounding structure which includes a fabric covering 120. The fabric covering 120 is impregnated with a thin mineral oil coating and/or an insecticide which is chosen for its ability to exterminate a specific insect or insects. Preferably, the insecticide is chosen for its ability to exterminate arthropods. Suitable insecticides include, but are not limited to, Permethrin, Resmethrin, and Deltamethrin. Other insecticides may be used without departing form the spirit and scope of the invention, as would be readily apparent to one of ordinary skill in the art. The fabric covering 120 may be impregnated on the inside and/or the outside thereof.

Fabric covering 120 is preferably a dark, and more preferably black, cloth-like material, e.g., non-woven, perforated polyethylene cloth, that has been impregnated with either a contact insecticide for purposes of killing insects, or mineral oil, for purposes of simply capturing insects. Fabric covering 120 allows $CO_2$ introduced into the interior of target 100 to dissipate out into surrounding environments to attract insects. Fabric covering 120 is preferably constructed of a supple fabric which mimics, to an insect, the small movements of a mammal. By providing such visual queues through the use of a supple fabric, the insect population of interest is therefore additionally attracted to target 100.

Feed holes 118 have a diameter large enough such that when taken together, there is no substantial pressure drop between the inside and outside of $CO_2$ feed tube 116, but small enough such that substantially no insects may enter into $CO_2$ feed tube 116. It has been found that a diameter for feed holes 118 of less than 1 millimeter is preferable. By constructing feed holes 118 of a diameter less than 1 millimeter, it has been found that the common sand fly, or sand flea, is not able to enter into $CO_2$ feed tube 112, because the common sand fly, or sand flea, is most typically 1 to 3 millimeters in size.

Top plate 102, as illustrated in the embodiment of FIG. 1, is preferably wider than top support ring 104 and bottom support ring 106, in order to shelter fabric covering 120 from rain. Top plate 102 is attached to upper cylindrical body 108 with a bolt, screw, rivet, or the like (not shown).

Top plate 102 may be attached such that top plate 102 and top support ring 104 meet on the upper surface of top support ring 104. Alternatively, top plate 102 may be attached to top cylindrical body 108 such that an opening or gap is presented between top plate 102 and top support ring 104. The purpose for such a gap (not shown) would be to allow insects to enter into the inside of target 100.

Bottom support ring 106 is preferably open to the atmosphere, allowing insects to freely enter target 100 from below. In an alternative embodiment, bottom support ring 106 may further include a plate (not shown), similar to top plate 102, which closes off the interior of target 100 from the exterior thereof.

Fabric covering 120 is wrapped around top support ring 104 and bottom support ring 106 and is attached thereto. Fabric covering 120 may be permanently affixed to either or both of the top support ring 104 and bottom support ring 106. Alternatively, fabric covering 120 may be releasably attached to top support ring 104 and/or bottom support ring 106 by using snap-fit couplings or the like (not shown) on the mating surfaces of top support ring 104, bottom support ring 106, and fabric covering 120. By constructing fabric covering 120 to be removable and/or replaceable, the life of target 100 may be effectively increased by allowing the oil and/or insecticide on fabric covering 120 to be replenished. Furthermore, target 100 may be periodically cleaned by removal of fabric covering 120 when fabric covering 120 is provided with snap-fit couplings or the like.

$CO_2$ feed tube 116 is connected at its bottom end to $CO_2$ orifice plate 122. $CO_2$ orifice plate 122 includes a straight bore orifice (not shown) which governs the release rate of gas through target 100 based upon the gas pressure in the system. $CO_2$ orifice plate 122 is, at its lower end, fluidly coupled to distribution feed tube 124, which supplies an insect attractant to target 100. The metering of $CO_2$ or a $CO_2$ mixture is accomplished by using the $CO_2$ orifice plate 122 and maintaining a known pressure differential across $CO_2$ orifice plate 122. $CO_2$ orifice plate 122 is held between two mated, threaded fittings at both its upper and lower ends (not shown) for connection to $CO_2$ feed tube 114 and the distribution feed tube 124.

In an alternative embodiment, $CO_2$ orifice plate 122 may be replaced with a controllable valve with or without an indicator, e.g., a rotometer. Such a controllable valve would allow the adjustment of the attractant flow rate to target 100 from distribution feed tube 124.

Figure 2:
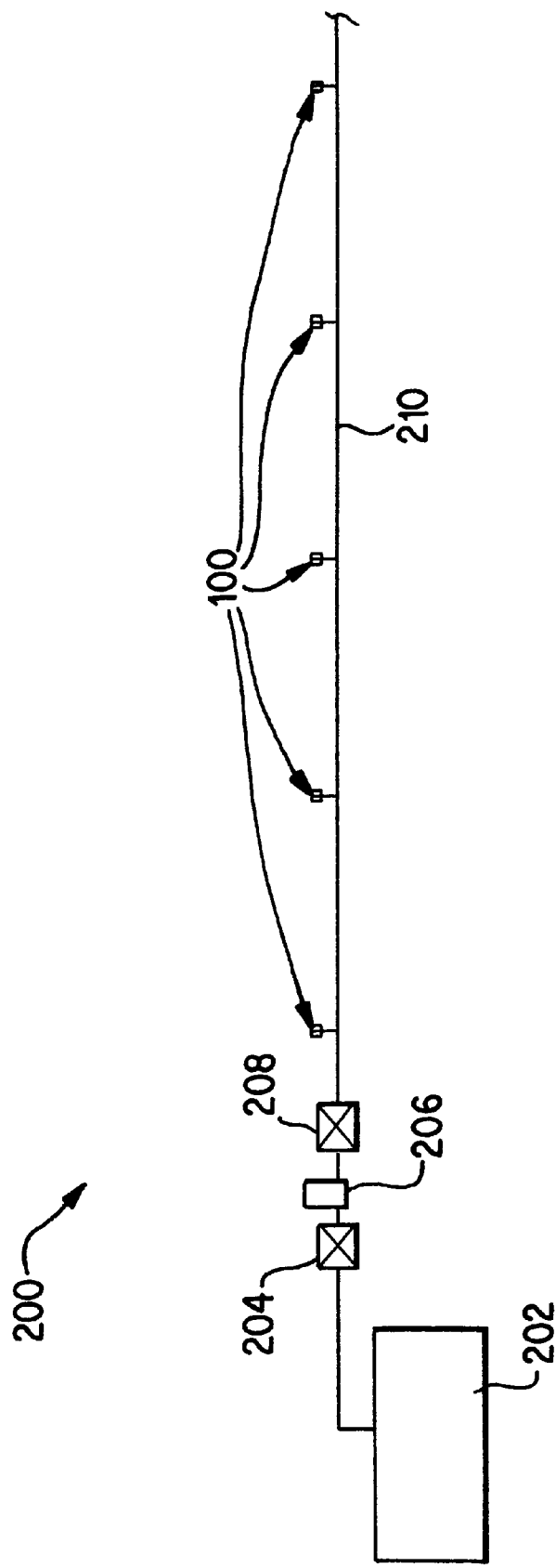
FIG. 2 is a schematic illustration of a $CO_2$ fence according to the present invention.

FIG. 2 illustrates a $CO_2$ fence system 200 according to the present invention. $CO_2$ source 202 supplies bulk $CO_2$ to $CO_2$ fence 200. $CO_2$ from $CO_2$ source 202 is serially fed to shut off valve 204, control system 206, and shut off valve 208. Control system 206 is illustrated in greater detail with reference to FIG. 3, below. Control system 206 controls the flow of $CO_2$ to $CO_2$ fence 200 with or without an adjunct attractant. $CO_2$ then is distributed through distribution piping 210 to targets 100 (see FIG. 1). Although FIG. 2 illustrated the $CO_2$ fence 200 including five targets 100, any suitable number of targets 100 may be fluidly attached to distribution piping 210, as would be readily apparent to one of ordinary skill in the art. The $CO_2$ fence 200 according to the present invention guarantees that the pressure differential across all the orifice plates 122 are the same, thus ensuring that flow rates are equivalent for the same sized orifices.

Figure 3:
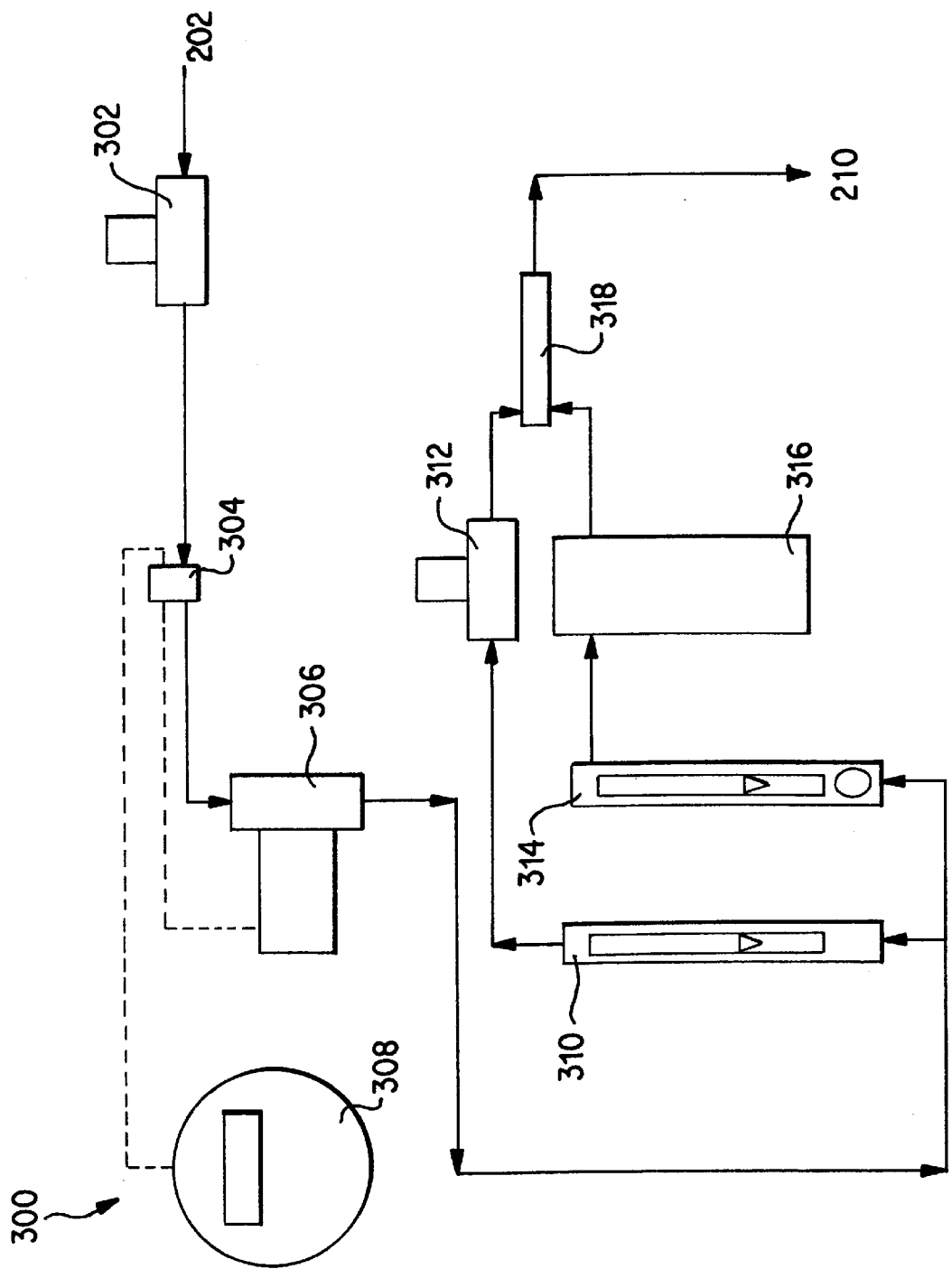
FIG. 3 is a schematic illustration of a control system flow diagram for a $CO_2$ fence according to the present invention.

FIG. 3 illustrates a $CO_2$ control system flow diagram 300 which is usable in conjunction with $CO_2$ fence 200, e.g., as control system 206 (see also FIG. 2). As illustrated in FIG. 3, $CO_2$ is fed from $CO_2$ bulk feed 202 to inlet $CO_2$ pressure regulator 302. Inlet $CO_2$ pressure regulator 302 regulates the pressure at which $CO_2$ is allowed to enter into system 300. Pressure regulated $CO_2$ then flows to flow limit switch 304 and further to solenoid valve 306. A 7-day timer 308 is in control signal communication with flow limit switch 304. Flow limit switch 304 is in control signal communication with solenoid valve 306.

Flow limit switch 304 provides at least one functions; in the event that there is an abnormal flow characteristic in system 300, flow limit switch 304 can be operated to send a disable control signal, e.g. "close", to solenoid valve 306. The 7-day timer 308 also can provide a control signal through control limit switch 304, indicating when a chosen release period has been initiated thus activating the flow of $CO_2$, and shutting off the flow of bulk $CO_2$ to system 300 at the end of the period.

When solenoid valve 306 is operated to an open position, $CO_2$ flows to $CO_2$ flow meter 310, which indicates the rate of flow of $CO_2$ out of system 300. $CO_2$ then flow from $CO_2$ flow meter 310 to outlet pressure regulator 312 which regulates the pressure of $CO_2$ exiting system 300. Carbon dioxide is then allowed to flow to distribution piping 210 (see FIG. 2).

Preferably, a flow rate of $CO_2$, or $CO_2$ mixture, from about 0.01 to about 7 SLM, (Standard Liters per Minute) more preferably about 0.1 to about 5 SLM, and even more preferably about 0.1 to about 3 SLM is maintained through the $CO_2$ fence according to the present invention.

Alternatively, a secondary insect attractant may be added to the $CO_2$ in system 300. To accommodate a second or adjunct insect attractant, secondary attractant flow control 314 is placed in a parallel flow path with $CO_2$ flow meter 310, as illustrated in FIG. 3. Secondary attractant flow control 314 includes a source of secondary attractant (not shown) contained in secondary attractant saturator 316. A metered quantity of $CO_2$ flows into into secondary attractant saturator 316, wherein $CO_2$ is saturated with the secondary attractant. The mixture of $CO_2$ and secondary attractant then flows to gas mixer 318 where it is mixed with $CO_2$ from outlet pressure regulator 312. The mixture of $CO_2$ and second attractant then flows from gas mixer 318 to distribution piping 210.

$CO_2$ and the secondary attractant can be premixed or, alternatively, mixed via the alternative saturator system of control system 300. The temperature of secondary attractant saturator 316 can be controlled such that the exact quantity of secondary attractant can be added. Typically, the quantity of secondary attractant added is between about 0 milligrams and about 20 milligrams per liter of released $CO_2$, and preferably between about 0 milligrams and about 8 milligrams per liter of $CO_2$ released. Control system 300 can be configured to operate on either 3 to 220 VAC or 1.5 to 48 VDC, thus allowing battery operation.

Figure 4:
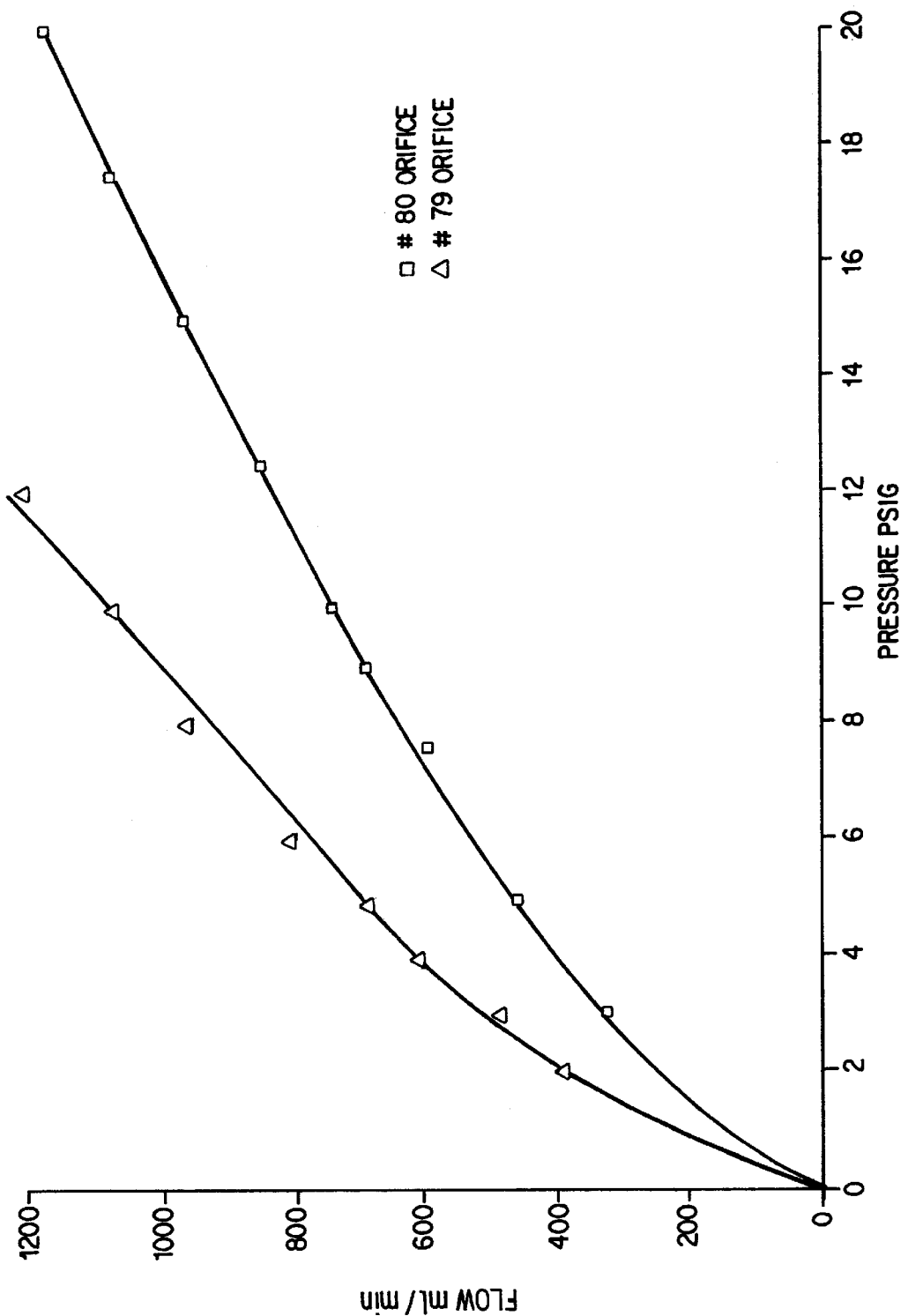
FIG. 4 is a graph illustrating $CO_2$ flow versus manifold pressure for different sized orifices according to the present invention.

FIG. 4 is a diagram showing the results of varying the gage pressure across $CO_2$ orifice plate 122 for different sized orifices. The upper line in FIG. 4 represents the flow-pressure characteristics for a number 79 orifice; the lower line represents the flow-pressure characteristics for a number 80 orifice. As can be readily appreciated from the data of FIG. 4, the flow of gas through orifice plate 122 is easily controlled and/or regulated by varying the gauge pressure of the gas on the upstream side of orifice plate 122. The predictability shown in FIG. 4 of the pressure flow characteristics of orifice plate 122 allows a $CO_2$ fence 200 according to the present invention to be readily customized for particular uses.

The components of the target 100 and the $CO_2$ fence 200 may be made of PVC, nylon, ABS, or any other material which is preferably easy to handle, easy to manufacture and has a low cost, as would be readily apparent to one of ordinary skill in the art.

While the invention has been described in detail with reference to preferred embodiments thereof, it will be apparent to one skilled in the art that various changes can be made, and equivalents employed, without departing from the scope of the invention.

We claim:

1. A target for exterminating and/or capturing insects, comprising:

a support structure;

a surrounding element mounted on, surrounding, and enclosing the support structure, said surrounding element having an interior space;

means provided on the surrounding element for effecting at least one of capture of an insect that comes into contact with the surrounding element and extermination of an insect that comes into contact with the surrounding element;

a tube extending into said interior space of said surrounding element for introducing a gas containing $CO_2$ into said interior space to attract insects into coming into contact with said surrounding element; and means to prevent passage of said insects into said tubes;

wherein said support structure comprises a first ring, a first hub, and a first leg extending between said first hub and said first ring, a second ring spaced from said first ring, a second hub, and a second leg, said second leg extending between said second hub and said second ring, said surrounding element being secured to said first ring and to said second ring.

2. A target in accordance with claim 1, further comprising a plurality of legs extending between said first hub and said first ring.

3. A target in accordance with claim 1, further comprising a plurality of legs extending between said second hub and said second ring.

4. A target in accordance with claim 1, wherein said tube extends through said first hub.

5. A target in accordance with claim 1, further comprising an orifice plate in said tube.

6. A target in accordance with claim 1, wherein said tube extends into said interior space through a first end of said target, and further comprising a top plate at an end of said target opposite said first end.

7. A target in accordance with claim 1, wherein said means for effecting at least one of capture and extermination is on the outside of said surrounding element.

8. A target in accordance with claim 1, wherein said means for effecting at least one of capture and extermination is on the inside of said surrounding element.

9. A target in accordance with claim 1, wherein said means for effecting at least one of capture and extermination is on both the inside and the outside of said surrounding element.

10. A system for exterminating and/or capturing flying and biting insects comprising:
a pressurized fluid source of primary chemical attractant for flying and biting insects;
a distribution feed tube in fluid communication with said fluid source;

a flow rate controller along said distribution feed tube controlling the flow of said primary chemical attractant for said insects from said pressurized fluid source through said distribution feed tube; and at least one target in fluid communication with said distribution feed tube, said at least one target including means for effecting, when one of said flying and biting insects comes into contact with the at least one target, either extermination or capture of said insect, said at least one target including an enclosed interior space in fluid communication with said distribution feed tube, said at least one target sealing off said interior space from an exterior thereof to substantially prevent the ingress of insects into said interior space;

wherein said flow rate controller controls the rate of flow of said primary chemical attractant through said distribution feed tube between 0.01 SLM and 7 SLM.

11. The system according to claim 10, wherein said chemical attractant is selected from the group consisting of carbon dioxide, acetone, octenol, and mixtures thereof.

12. The system according to claim 10, further comprising means for mixing a secondary chemical attractant with said primary chemical attractant.

13. The system according to claim 10, wherein said at least one target comprises two targets in fluid communication with said distribution feed tube.

14. The system according to claim 13, wherein said two targets are in parallel fluid communication with said distribution feed tube.

15. A system according to claim 10 , wherein said flow rate controller controls the rate of flow of the primary chemical attractant to between 0.1 SLM and 5 SLM.

16. A system according to claim 10, wherein said flow rate controller controls the rate of flow of the primary chemical attractant to between 0.1 SLM and 3 SLM.

17. A process for attracting flying and biting insects to a target, comprising the steps of:

providing a system for either exterminating or capturing insects, said system including a pressurized fluid source of primary chemical insect attractant for said insects, a distribution feed tube in fluid communication with said source, a flow rate controller along said distribution feed tube for controlling the flow of primary chemical attractant from said pressurized fluid source through said distribution feed tube, and at least one target in fluid communication with said distribution feed tube, said at least one target including means for either capturing or exterminating said insects when said insects come into contact with said target, said at least one target including an enclosed interior space in fluid communication with said distribution feed tube, said at least one target sealing off said interior space from an exterior thereof to substantially prevent the ingress of insects into said interior space;

flowing said primary chemical insect attractant serially from said pressurized fluid source, through said flow rate controller, through said distribution feed tube, and to said at least one target;

controlling the rate of flow of said primary chemical insect attractant with said flow rate controller to between 0.01 SLM and 7 SLM; and contacting insects with said means for either capturing or exterminating insects.

18. The process according to claim 17, further comprising flowing a secondary chemical insect attractant to said at least one target.

19. A process in accordance with claim 17, wherein said step of controlling the rate of flow comprises controlling the rate of flow to between 0.1 SLM and 5 SLM.

20. A process system in accordance with claim 17, wherein said step of controlling the rate of flow comprises controlling the rate of flow to between 0.1 SLM and 3 SLM.

* * * * *